(No Model.)

E. FRARY.

COMBINED SHOVEL AND ASH SIFTER.

No. 287,116. Patented Oct. 23, 1883.

WITNESSES:

INVENTOR
Elisha Frary
BY
ATTORNEYS.

UNITED STATES PATENT OFFICE.

ELISHA FRARY, OF EAST NEW YORK, N. Y.

COMBINED SHOVEL AND ASH-SIFTER.

SPECIFICATION forming part of Letters Patent No. 287,116, dated October 23, 1883.

Application filed September 7, 1883. (No model.)

*To all whom it may concern:*

Be it known that I, ELISHA FRARY, of East New York, in the State of New York, have invented certain new and useful Improvements in Combined Shovels and Ash-Sifters, of which the following is a specification.

This invention has reference to an improved coal-shovel combined with a sieve; and the invention consists of a shovel having a screened bottom and a guard-frame hinged to the sides of the shovel, and adapted to be thrown back, so as to rest on the handle, or on the front part or lip of the shovel.

Figure 1:
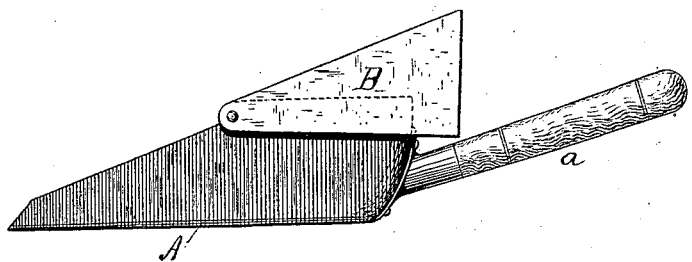
Figure 2:
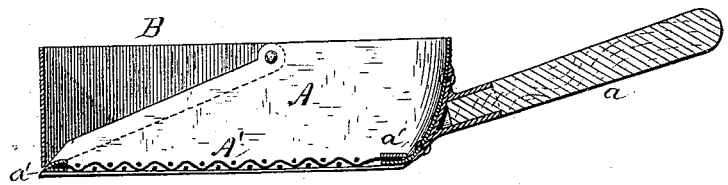
Figure 3:
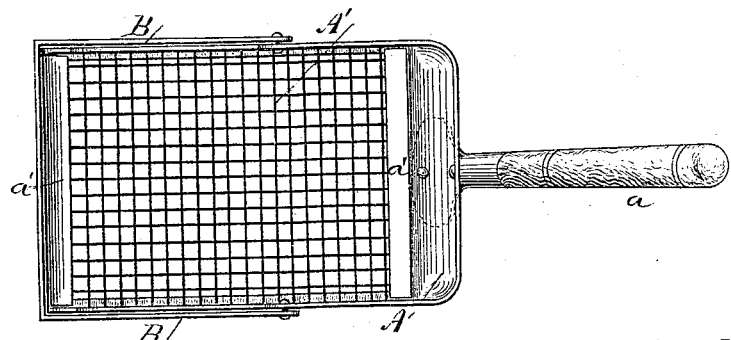

In the accompanying drawings, Figure 1 represents a side view of my improved coal-shovel having the guard-frame thrown back. Fig. 2 shows a vertical longitudinal section of the same, with the guard-frame resting on the front of the shovel, so as to form a sifter therewith; and Fig. 3 is a plan of Fig. 2.

Similar letters of reference indicate corresponding parts.

In the drawings, A represents the main body of a coal-shovel that is provided at its back with a handle, $a$. The bottom of the shovel is open and covered by a wire screen, A', that is soldered to the front and rear edges, $a'$ $a'$, of the bottom, and to the sides of the shovel. To the side walls of the shovel A is pivoted or hinged a U-shaped guard, B, that forms, when resting on the front or lip of the bottom, an ash-sifter. When the guard is thrown back into open position, so as to rest on the handle $a$, the shovel can be readily filled with coal or ashes. The guard B is then thrown forward on its pivot, so as to rest on the front edge of the shovel, and retain thereby the coal and ashes in the screened bottom A', so that they can be shaken without dropping off. The ashes are thereby sifted through the screen, while the unburned coal particles remain on the screen, for future use. In this manner a common hand-shovel can be used conveniently as an ash-sifter, and produces a considerable saving of coal, as it compels the servant to screen the ashes as the same are removed from the ash-pit of the stove or other fire-place.

Having thus described my invention, I claim as new and desire to secure by Letters Patent—

1. A combined coal-shovel and ash-sifter, consisting of a shovel having a screened bottom and a guard-frame pivoted thereto, and adapted to be thrown into forward or backward position thereon, substantially as and for the purpose set forth.

2. A combined coal-shovel and ash-sifter, composed of a shovel having a screened bottom, and of a U-shaped guard-frame pivoted to the side walls thereof, and adapted to be thrown back, so as to rest on the handle, or forward, so as to rest on the front or lip of the shovel, substantially as set forth.

In testimony that I claim the foregoing as my invention I have signed my name in the presence of two subscribing witnesses.

ELISHA FRARY.

Witnesses:
 PAUL GOEPEL,
 SIDNEY MANN.